May 24, 1927. W. N. FRANK 1,630,000
LIQUID LEVEL GAUGE
Filed Feb. 7, 1924 2 Sheets-Sheet 1
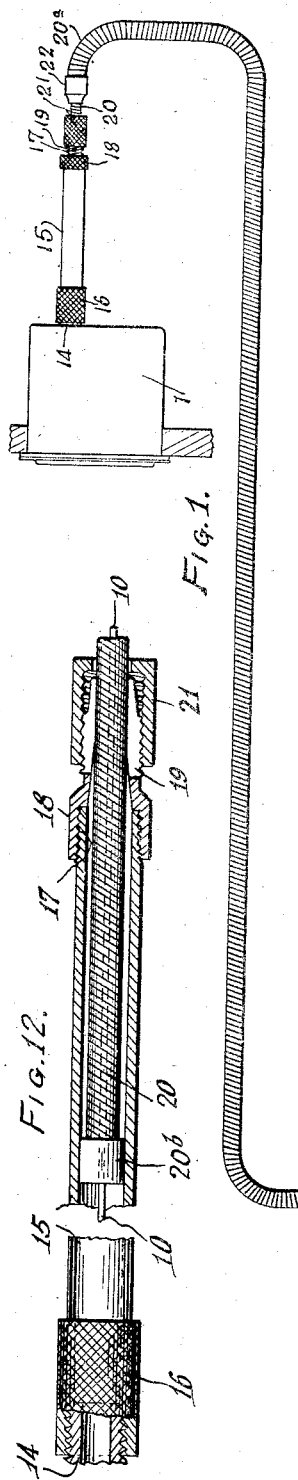
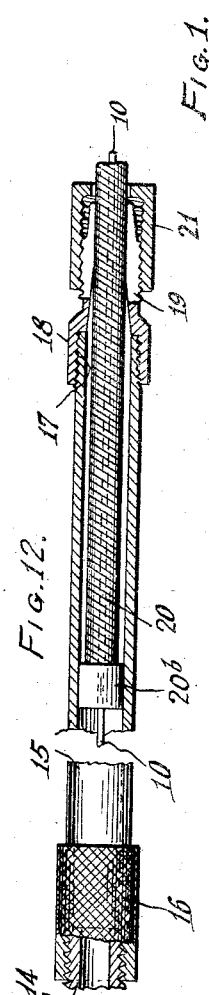
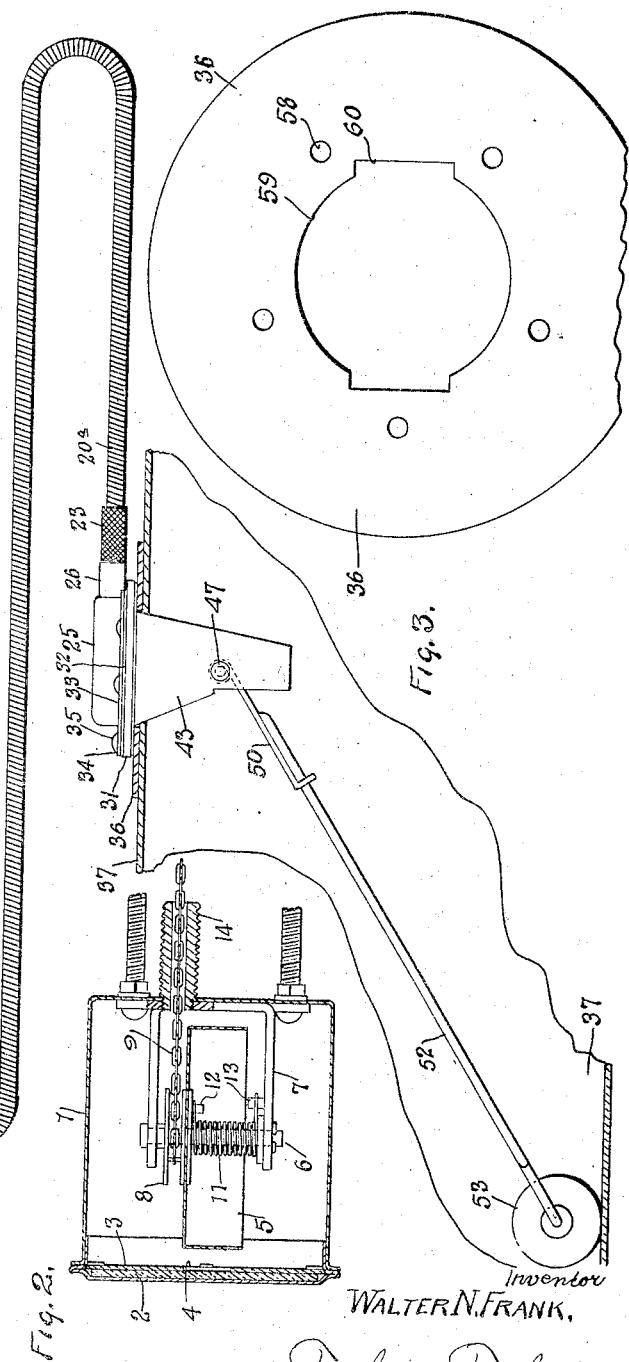
Inventor
WALTER N. FRANK.
Attorneys May 24, 1927.  
W. N. FRANK  
LIQUID LEVEL GAUGE  
Filed Feb. 7, 1924
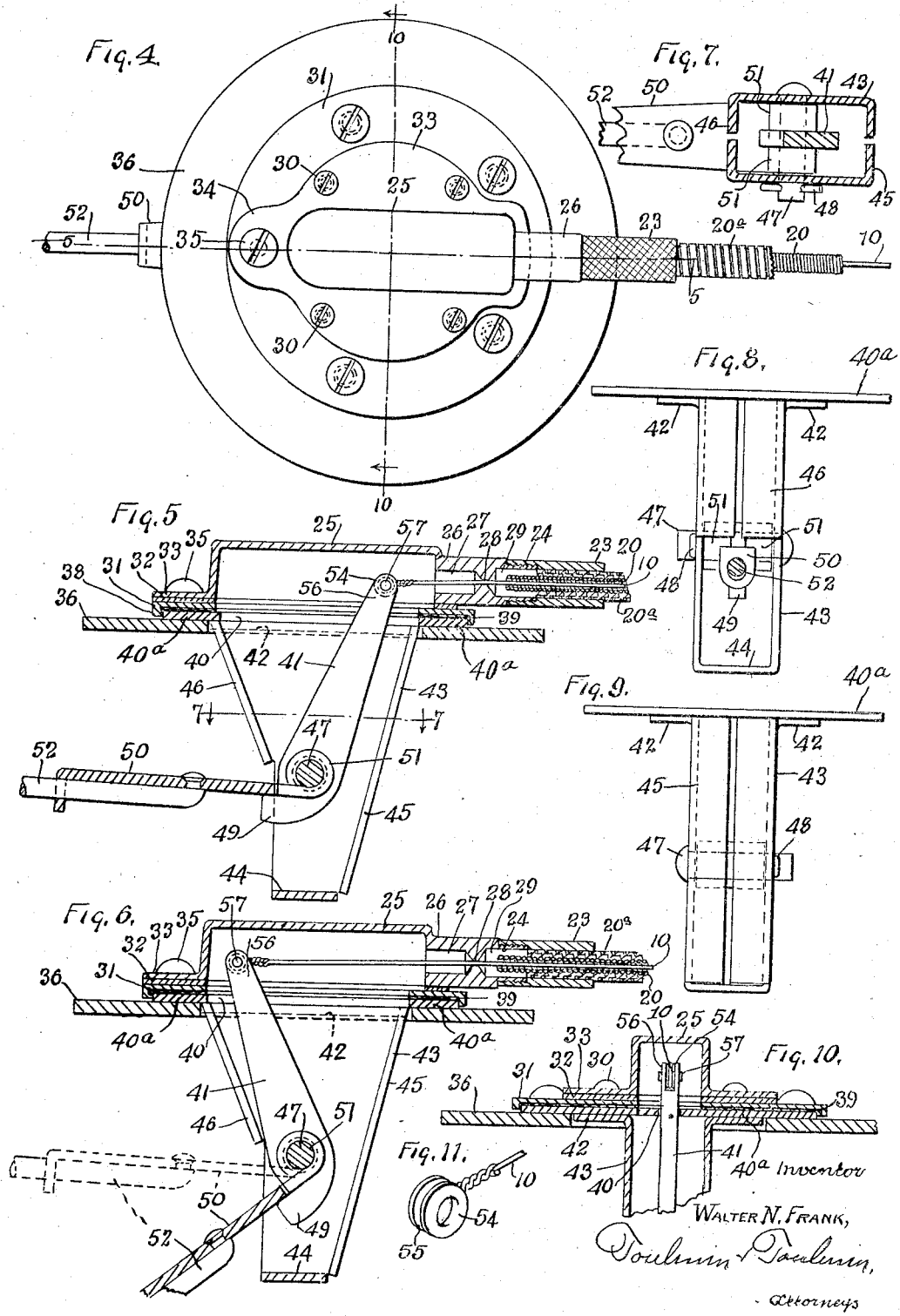

Patented May 24, 1927.

1,630,000

UNITED STATES PATENT OFFICE.

WALTER N. FRANK, OF DAYTON, OHIO, ASSIGNOR TO THE GROLAN MANUFACTURING COMPANY, OF DAYTON, OHIO, A CORPORATION OF DELAWARE.

LIQUID-LEVEL GAUGE.

Application filed February 7, 1924. Serial No. 691,222.

My invention relates to gauges and in particular to liquid level gauges.

It is the object of my invention to provide a gasoline gauge in which the indicator is remote from the tank and in which the flexible communicating means is pulled in one direction by a spring or the like and in the other direction by the float.

It is a further object of my invention to provide a tank unit which may be definitely located in a predetermined position in the tank and may be inserted in the tank during the assembly of the automobile after the tank has been manufactured and completed. One of the objects of my invention is to provide a mechanism which may be easily and quickly assembled in a production line in an automobile factory.

It is my object to provide such a gauge which must be installed only in one way, so that the mechanic making the installation cannot display any judgment or tamper with the gauge equipment in any way.

It is a further object of my invention to provide such an equipment which will permit of being tested to ascertain if the float is on the bottom of the tank before being finally assembled on the automobile.

It is a further object to provide a cheap and economical construction, in which the float lever forms its own eye to serve as the bearing for its support.

It is an additional object to provide a means of attaching the flexible wire to its anchoring connections to prevent any bending or twisting of the wire and its consequent breaking. It is a further object to provide a gasoline barrier in such a combination.

It is my object to provide a substantially complete enclosed housing for the operating parts, so that they cannot be tampered with by workmen or cannot be injured in handling or transportation.

It is my object to provide a float arm which may move freely with respect to the wire arm in one direction to relieve the wire arm and wire of many unnecessary strains and jerks which would have a tendency to break the wire or bend it and destroy it.

It is an additional object to provide a relatively large housing for the upper end of the wire arm and the wire so that there may be no binding and so that minor imperfections in manufacturing, such as accumulations on the inside of the housing, will not affect the operation of the gauge.

Referring to the drawings:

Figure 1 is a side elevation of the complete gauge equipment, showing the dashboard and tank in section.

Figure 2 is a section through the indicator head.

Figure 3 is a plan view of the tank plate with its positioning shoulders.

Figure 4 is a top plan view of the tank unit.

Figure 5 is a section on the line 5—5 of Figure 4 with the float lever in a position off of the bottom of the tank.

Figure 6 is a similar view with the float on the bottom of the tank and also showing in dotted lines the position the float arm may assume before the wire arm can catch up to it, in case of a sudden movement of the float.

Figure 7 is a section on the line 7—7 of Figure 5.

Figure 8 is a vertical elevation of the inclosing bracket unit from the float side of the tank unit.

Figure 9 is a like elevation of the inclosing bracket unit from the opposite end of the tank unit.

Figure 10 is a section on the line 10—10 of Figure 4.

Figure 11 is an enlarged detail view of the eye on the end of the wire.

Figure 12 is a section through the tube which connects the guiding tube to the indicator.

Referring to the drawings in detail:

1 is the casing of the indicator head, which has a glass cover 2 above the end plate 3 which is provided with an aperture 4 for disclosing the figures on the drum 5. This drum is mounted on a shaft 6 which is journaled in a U-shaped supporting bracket 7 carried by the casing 1. Upon the shaft is not only mounted the drum 5, but a grooved pulley 8. This pulley turns with the drum 5 and in its groove is attached the chain 9. The chain and the wire 10 to which it is attached, as well as the drum and pulley, are moved in one direction by the helical spring 11, one end of which is attached to a stud 12 on the drum and the other end on a stud 13 on the U-shaped bracket 7.

The chain 9 passes out through a threaded tubular member 14 which is mounted in the rear of the casing 1. To this tubular member there is attached a stiff tube 15 by a collar 16. The tube 15 has a threaded end 17, upon which is mounted a collar 18 carrying a plurality of externally threaded fingers 19, which embrace the flexible protecting and guiding tube 20 and are clamped thereon by the nut 21, which is threaded on such fingers.

This inner guide casing 20 has secured to its end adjacent the tank a collar 20<sup>b</sup> which snugly fits within the tube 15 and is provided from a point beyond the tube 15 with an outer heavier protecting casing 20<sup>a</sup> which is attached thereto at one end by the crimped head 22.

The tank end of the casing 20<sup>a</sup> is attached by a collar 23 to the threaded tubular member 24 which is formed on one end of the housing 25. This housing is projected laterally into a tubular member 26, which has a relatively large area therein as at 27, which terminates in a restricted passageway 28 through which the wire 10 passes. This passageway expands into a large area 29. The purpose of the restricted passageway is to form a seal or means for preventing the passage of gasoline from the tank into the tubes 20 and 20<sup>a</sup>.

This housing 25 is mounted by the screws 30 on a plate 31. There is a packing 32 between the flange 33 of the housing 25 and the plate 31 to prevent gasoline leakage. This flange 33 is extended rearwardly into an ear 34, through which one of the screws 35 passes. This prevents the housing 25 from becoming detached and anchors it to the tank plate 36 which is mounted upon the tank 37. The plate 31 has a turned-over edge 38 and a cork packing 39 between it and plate 40<sup>a</sup> secured to the ears 42 of a U-shaped inclosing bracket 43, as by welding or otherwise. The screws 35 serve to hold this intermediate plate or ring 31 as also the bracket plate 40<sup>a</sup> on the tank plate 36.

The bracket 43 has parallel side walls, a bottom wall 44, turned-over ends walls 45 and turned-over end walls 46. The purpose of these end walls is to prevent anyone from putting a tool or their fingers against the wire or wire arm, thus damaging the mechanism. The plate 40<sup>a</sup> gives rigidity to the bracket and is adapted to rest on the tank plate 36 within the recess formed by the turned-over edges 38 of the plate 31. This plate 40<sup>a</sup> is provided with a slot 40 to permit the wire arm 41 to move back and forth, the upper end of said wire arm projecting within the housing 25.

Located between the side walls of this bracket is the pivot pin 47 which is held in position by a head on one end and a cotter pin 48 on the other. Mounted on this pin 47 is the wire arm 41 which is provided with a downwardly and laterally extending stop 49, which engages with the float arm 50 when the float is moving downwardly and pulling the wire 10 against the tension of the spring 11. This float arm is a flat piece of metal which may be ribbed for strength, which has its end split into two parts which are turned over to form the eyes 51, which serve as bearings for mounting upon the pivot pin 47. The wire arm 41 is pivoted on 47 between these two eyes, the projection 49 of the wire arm engaging with the bottom portion of the float arm 50. This arm carries a wire 52 and a transversely located float 53, which is so arranged that its point of connection is always equidistant from its periphery, so that the end of the float always rests the same distance above the bottom of the tank 37 when the parts are at zero position.

It will be observed that the wire 10 has located in one end thereof a collar 54, the wire being wrapped in a groove 55 on the exterior of the collar. This collar is located in the jaws 56 at the upper end of the wire arm and through the collar is passed the pin 57 which is also mounted in the arms of the jaw 56. The sleeve 54 with the wire 10 turns on this pin, so that no matter what the position of the wire arm or lever 41 may be, the wire will always be pulled in a substantially straight line.

In assembly the tank plate 36, which is provided with the screw holes 58, is mounted upon the tank adjacent the opening provided in the tank for the insertion of the tank end of this gauge equipment. It will be noted that on either side of the cutaway portion 59 in the tank plate are notches 60 having square shoulders, which exactly fit the outside dimensions of the rectangular bracket 43. In ordinary practice on the assembly line the tank will be mounted on the chassis. The plate 36 will have already been installed on the tank. All that the gauge assembler will have to do is to fit the rectangular bracket into the shoulders provided on the tank plate and insert the screws 35 into the proper openings. The float is of such a dimension that it may be readily inserted through the opening of the tank and tank plate. The indicating head is mounted on the dashboard, so that the wire 10 may be connected to the chain 9 and the collars tightened and positioned. Before doing this, the wire can be actuated to see if all the parts are moving freely and to see if the float is on the bottom of the tank, because a pull on the wire will lift the float arm and float. The parts are then connected in this zero position with the drum indicating zero.

In operation, a sudden surge of the gasoline may carry the float suddenly upwardly, but this will not disturb the wire immediately. It will be observed that there will be no thrust on the wire and no compression, which is an essential feature of my gauge because this prevents buckling or snapping of the wire, like the cracking of a whip. The sudden descent of the float is cushioned by the spring 11. It will thus be seen that there is a minimum of assembly work to be done in the assembly line, that there is no possibility of the fingers or tools of the operator bending or tampering with the wire and its connections, and that the arrangement of the parts permits of the installation of them in one way only and that is the correct way. It has been found essential to have such an arrangement of parts for safe and economical production in the installation of thousands of such gauges in the quantity production of automobiles.

I desire to comprehend within my invention such modifications as may be necessary to adapt it to varying conditions.

Having thus fully described my invention, what I claim as new and desire to secure by Letters Patent, is:

1. In a liquid level gauge, a tank, an indicator, a communicating means connected to said indicator, a float and float arm, an inclosing bracket mounted in said tank, means to mount said float arm in said bracket, means connecting said float arm and communicating means, a part of said connecting means being inclosed by said bracket, means to guide and protect said communicating means, means to inclose one end of the communicating means and the upper end of the connecting means at their point of union, whereby tampering with said communicating means and said connecting means is prevented.

2. In a liquid level gauge, a tank, an indicator, a flexible communicating means connected to said indicator, guiding and protecting means for the communicating means, an inclosing bracket mounted in said tank, a float and float arm pivotally mounted in said bracket, a wire arm partly inclosed by said bracket and connecting said communicating means to said float arm, whereby tampering with the connections between the communicating means, wire arm and float arm is prevented.

3. In a liquid level gauge, an enclosing bracket extending within a tank and having one end open, a float arm pivotally mounted therein, a wire arm pivotally mounted therein and moving with said float arm, a housing over the open end of said bracket, a wire connected to the upper end of said wire arm and travelling within said housing, a flexible guide means surrounding said wire and attached to said housing, an indicator, and means whereby said indicator is attached to said wire.

4. In a liquid level gauge, an enclosing bracket extending within a tank and having one end open, a float arm pivotally mounted therein, a wire arm pivotally mounted therein, a housing over the open end of said bracket, a wire connected to said wire arm and travelling within said housing, a flexible guide means surrounding said wire and attached to said housing, an indicator, and means whereby said indicator is attached to said wire, said float arm and wire arm being adapted to move freely with respect to one another, and means on said wire arm for engaging said float arm when the float arm is moving downwardly, so that they will move together.

5. In a liquid level gauge, an enclosing bracket extending within a tank and having an open end, a float arm pivotally mounted therein, a wire arm pivotally mounted therein, a housing over the open end of said bracket, a wire connected to said wire arm and travelling within said housing, a flexible guide means surrounding said wire and attached to said housing, an indicator, means whereby said indicator is attached to said wire, said float arm and wire arm being adapted to move freely with respect to one another, means on said wire arm for engaging said float arm where the float arm is moving downwardly, so that they will move together, and yielding means for maintaining said wire taut and for maintaining the wire arm and float arm in engagement with one another.

6. In a liquid level gauge, an enclosing bracket extending within a tank and having an open end, a float arm pivotally mounted therein, a wire arm pivotally mounted therein, a housing over the open end of said bracket, a wire connected to said wire arm and travelling within said housing, a flexible guide means surrounding said wire and attached to said housing, an indicator, means whereby said indicator is attached to said wire, said float arm and wire arm being adapted to move freely with respect to one another, means on said wire arm for engaging said float arm when the float arm is moving downwardly, so that they will move together, yielding means for maintaining said wire taut and for maintaining the wire arm and float arm in engagement with one another, and means for attaching the wire to the wire arm, consisting of a pair of jaws on the upper end of the wire arm, a collar to which the end of the wire is secured, and means for mounting said collar between said jaws.

7. In a liquid level gauge, a tank, a notched tank plate therefor, a bracket adapted to fit in said notch and to be positioned thereby, means of suspending said bracket from said tank plate, a float arm mounted within said bracket, an indicator, flexible communicating means, and means for connecting said communicating means at one end with said float arm and other means for connecting the opposite end of said communicating means with said indicator.

8. In a liquid level gauge, a tank, a tank plate therefor having an aperture therein and notches for positioning a bracket, an inclosing bracket suspended in said tank and having flanges adapted to fit in the notches in said tank plate, positioning means secured to said bracket and adapted to rest on said tank plate, a ring having a turned-over edge adapted to engage said positioning means and a sealing medium between said ring and positioning means, a housing mounted upon said ring, a sealing medium between said ring and housing, a float arm pivoted within said bracket and carrying a float, an indicator, a wire arm pivoted in said bracket and moving with said float arm, and a flexible communicating means connected to said wire arm and indicator.

9. In a liquid level gauge, a tank, a tank plate therefor having an aperture therein and notches for positioning a bracket, an inclosing bracket suspended in said tank and having portions adapted to fit in the notches in said tank plate, a plate secured to said bracket and adapted to rest on said tank plate, a ring having a turned-over edge adapted to engage said plate and a sealing medium between said ring and bracket plate, a housing mounted upon said ring, a sealing medium between said ring and housing, a float arm pivoted within said bracket and carrying a float, an indicator, a wire arm pivoted in said bracket and moving with said float arm, a flexible communicating means connected to said wire arm and to said indicator, said inclosing bracket and its housing preventing unauthorized access to the wire arm and the flexible communicating means, and means for guiding and protecting said flexible communicating means in its passage from the tank to the indicator.

10. In a liquid level gauge, a tank, a tank plate therefor having an aperture therein and notches for positioning a bracket, a bracket suspended in said tank and having portions adapted to fit in the notches in said tank plate, a plate secured to said bracket and adapted to rest on said tank plate, a ring having a turned-over edge adapted to engage said bracket plate, and a sealing medium between said ring and bracket plate, a housing mounted upon said ring, a sealing medium between said ring and housing, a float arm pivoted within said bracket and carrying a float, an indicator, a wire arm pivoted in said bracket and having a projection to engage said float arm, a flexible communicating means connected to said wire arm and to said indicator, said inclosing bracket and its housing preventing unauthorized access to the wire arm and the flexible communicating means, means for guiding and protecting said flexible communicating means in its passage from the tank to the indicator, yielding means to maintain said flexible communicating means taut and move it in one direction, said wire arm and float arm being adapted to move freely with respect to one another in one direction and to be limited in such movement in the other direction, whereby the wire will be moved by the float arm in one direction and by the yielding means in the other direction.

11. In a liquid level gauge, an inclosing bracket, a float arm pivoted in said bracket, a float carried by said float arm and so arranged as to always maintain the float arm a uniform distance above the bottom of the tank when the parts are at zero position, a wire arm pivotally mounted in said bracket and having a projection to engage said float arm, a wire, means for pivotally connecting said wire to the upper end of the wire arm, a housing enclosing the upper end of the wire arm and the end of the wire, a guiding tube for said wire, a protecting tube for said wire, an indicator, yielding means in said indicator for maintaining said wire taut, said wire arm and float arm being so arranged within the inclosing bracket that they may move freely with respect to one another in one direction and will move with one another in another direction.

12. In a liquid level gauge, a bracket, a float arm pivoted thereon, one end of said arm being bifurcated and turned over to form eyes to serve as bearings for the pivotal support of the wire arm, a wire arm pivoted between the bifurcated arm portions, a stop on said wire arm for engaging the said float arm, a pin passing through said eyes and wire arm for pivotally supporting them on said bracket, a flexible communicating means connected to said wire arm, an indicator, means for connecting said communicating means to said indicator and yielding means for moving said wire arm in one direction.

13. In a liquid level gauge, a bracket, a float arm pivoted thereon, one end of said arm being bifurcated and turned over to form eyes to serve as bearings for the pivotal support of the wire arm, a wire arm pivoted between the bifurcated arm portions, a stop on said wire arm for engaging the said float arm, a pin passing through said eyes and wire arm for pivotally supporting them on said bracket, a flexible communicating means connected to said wire arm, an indicator, means for connecting said communicating means to said indicator, yielding means for moving said wire arm in one direction, and means to close the top of said bracket and prevent access to the wire arm and its connections.

14. In a liquid level gauge, a tank, a tank plate therefor, an inclosing bracket adapted to be suspended in said tank, a wire arm pivotally mounted in said bracket, a float and float arm pivotally mounted in said bracket, said wire arm moving with said float arm, a plate secured to said bracket and adapted to rest on said tank plate, a ring mounted on said bracket plate, a housing mounted on said ring, means of attaching said housing, ring and tank plate to one another, said bracket plate having a cutaway portion to permit the wire arm to operate therein, an indicator, a flexible communicating means, and means for connecting said communicating means at one end to said wire arm, and other means for connecting said communicating means at its opposite end to said indicator.

In testimony whereof, I affix my signature.

WALTER N. FRANK.